(12) United States Patent
Yasukochi (10) Patent No.: US 12,416,907 B2
(45) Date of Patent: Sep. 16, 2025

(54) TOOL PATH GENERATION METHOD, TOOL PATH GENERATION DEVICE, AND MACHINE TOOL CONTROL DEVICE

(71) Applicant: MAKINO MILLING MACHINE CO., LTD., Tokyo (JP)

(72) Inventor: Jiro Yasukochi, Kanagawa (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 457 days.

(21) Appl. No.: 17/784,450

(22) PCT Filed: Dec. 11, 2020

(86) PCT No.: PCT/JP2020/046385
§ 371 (c)(1),
(2) Date: Jun. 10, 2022

(87) PCT Pub. No.: WO2021/117893
PCT Pub. Date: Jun. 17, 2021

(65) Prior Publication Data
US 2023/0004140 A1    Jan. 5, 2023

(30) Foreign Application Priority Data
Dec. 13, 2019   (JP) ................................. 2019-225809

(51) Int. Cl.
G05B 19/4097    (2006.01)
(52) U.S. Cl.
CPC .................... *G05B 19/4097* (2013.01); *G05B 2219/36342* (2013.01)
(58) Field of Classification Search
CPC ............ G05B 19/4093; G05B 19/4097; G05B 2219/36342; Y02P 90/02
See application file for complete search history.

(56) References Cited

U.S. PATENT DOCUMENTS 5,815,401 A    9/1998  Otsuki et al.
2006/0284871 A1*  12/2006  Kee ........................ G06T 19/00
                                                                 345/423

(Continued)

FOREIGN PATENT DOCUMENTS

CN    105045205 B    12/2017
JP    S62-151978 A    7/1987

(Continued)

OTHER PUBLICATIONS

Sathyan Subbiah, Science of Machining, Jan. 1, 2014, Handbook of Manufacturing Engineering and Technology, pp. 1-21 (Year: 2014).*

(Continued)

*Primary Examiner* — Tameem D Siddiquee
(74) *Attorney, Agent, or Firm* — Merchant & Gould P.C.

(57) ABSTRACT

Provided is a tool path generation method for generating a tool path (Tp), along which a workpiece is machined as a tool (T) moves over a tool movement curved surface (So) generated along a work surface of the workpiece. In this method: a scanning policy is set, which is a rule for establishing a path along which the tool is to move over the tool movement curved surface (So); a dividing line (Cd) is disposed on the tool movement curved surface (So); and the location of an intersection of the dividing line and a trajectory of the tool moving over the tool movement curved surface is calculated on the basis of the scanning policy. A tool path is generated, the path being represented by a movement command for curve interpolation using a curve that passes through the location of the intersection.

6 Claims, 10 Drawing Sheets

(56) References Cited

U.S. PATENT DOCUMENTS

| | | | | |
|---|---|---|---|---|
| 2011/0285742 A1* | 11/2011 | Kilgard | ................ | G06T 11/203 |
| | | | | 345/589 |
| 2014/0180465 A1* | 6/2014 | Nakano | .............. | G05B 19/4097 |
| | | | | 700/160 |
| 2015/0056036 A1 | 2/2015 | Yasukochi et al. | | |
| 2020/0159187 A1* | 5/2020 | Zeng | ................ | G05B 19/4099 |

FOREIGN PATENT DOCUMENTS

| | | |
|---|---|---|
| JP | H07-244515 A | 9/1995 |
| JP | H08-305430 A | 11/1996 |
| JP | 2006-68901 A | 3/2006 |
| WO | 2013/145286 A | 10/2013 |

OTHER PUBLICATIONS

International Search Report for PCT/JP2020/046385 (Jan. 12, 2021).

* cited by examiner

TOOL PATH GENERATION METHOD, TOOL PATH GENERATION DEVICE, AND MACHINE TOOL CONTROL DEVICE

This application is a National Stage Application of PCT/JP2020/046385, filed Dec. 11, 2020, which claims benefit of priority to Application No. 2019-225809, filed Dec. 13, 2019, in Japan, and which applications are incorporated herein by reference. To the extent appropriate, a claim of priority is made to each of the above disclosed applications.

FIELD

The present invention relates to a tool path generation method and tool path generation device for generating a curve command with which steps which can occur between adjacent tool paths can be suppressed and a high-quality machined surface can be achieved, as well as a controller for a machine tool in which the tool path generation device is incorporated.

BACKGROUND

In order to generate a tool path, in CAM (computer-aided manufacturing), a curve serving as a tool path is generated along a curved surface offset from the surface of the model shape, which is the ultimate shape of the workpiece generated by CAD (computer-aided design). Since this curve is a high-order mathematical expression, it is conventionally fit to a straight line, an arc, a low-order mathematical curve, etc., to facilitate handling. However, in order to prevent an increase in data capacity due to such fitting, approximation within the margin of error is required. For example, Patent Literature 1 describes, in the numerical controller of a machine tool, a tool path generation method which generates a smooth tool path by fitting and smoothing a tool path given by command points to a NURBS curve.

CITATION LIST

Patent Literature

[PTL 1] Japanese Unexamined Patent Publication (Kokai) No. 08-305430

SUMMARY

Technical Problem

However, since the tool path generation method described in Patent Literature 1 does not take into consideration information of adjacent tool paths, there may be steps due to errors between adjacent tool paths, whereby there is a problem in that the quality of the machined surface is degraded.

The present invention aims to solve such problems of the prior art, and an object thereof is to minimize or eliminate steps between adjacent tool paths.

Solution to Problem

In order to achieve the object described above, according to the present invention, there is provided a tool path generation method for generating a tool path for machining a workpiece while a tool moves on a tool movement curved surface generated along a surface of the workpiece to be machined, the method comprising the steps of setting a scanning policy which is a rule for determining a path on the tool movement curved surface along which the tool moves, arranging dividing lines on the tool movement curved surface, calculating positions of intersections between a trajectory when the tool moves on the tool movement curved surface based on the scanning policy and the dividing lines, and generating a tool path represented by movement commands which is curve-fit to a curve passing through the positions of the intersections.

Further, according to the present invention, there is provided a device for generating a tool path which is a movement path of a tool along a workpiece for machining the workpiece by moving the tool and the workpiece, which faces the tool, relative to each other, the device comprising a tool movement curved surface generation unit configured to generate a tool movement curved surface along a surface of the workpiece to be machined, a machining pattern selection unit configured to select a machining pattern for machining the workpiece, a dividing line generation unit configured to generate dividing lines along the tool movement curved surface, and a calculation unit configured to project the machining pattern selected by the machining pattern selection unit onto the surface to be machined, calculate positions of intersections between a trajectory when the tool moves on the tool movement curved surface and the dividing lines, and generate a tool path represented by movement commands which is curve-fit to a curve passing through the positions of the intersections.

Further, according to the present invention, there is provided a controller for a machine tool comprising the tool path generation device described above.

Advantageous Effects of Invention

According to the present invention, since one machining area is divided into a plurality of curved surfaces by the dividing lines and smoothed so that the connecting points of the curve are located on the dividing lines between the curved surfaces, envelope inflation in a direction transverse to the tool path is reduced, whereby a smooth machined surface can be obtained.

DESCRIPTION OF EMBODIMENTS

The preferred embodiments of the present invention will be described below with reference to the attached drawings.

Figure 1:
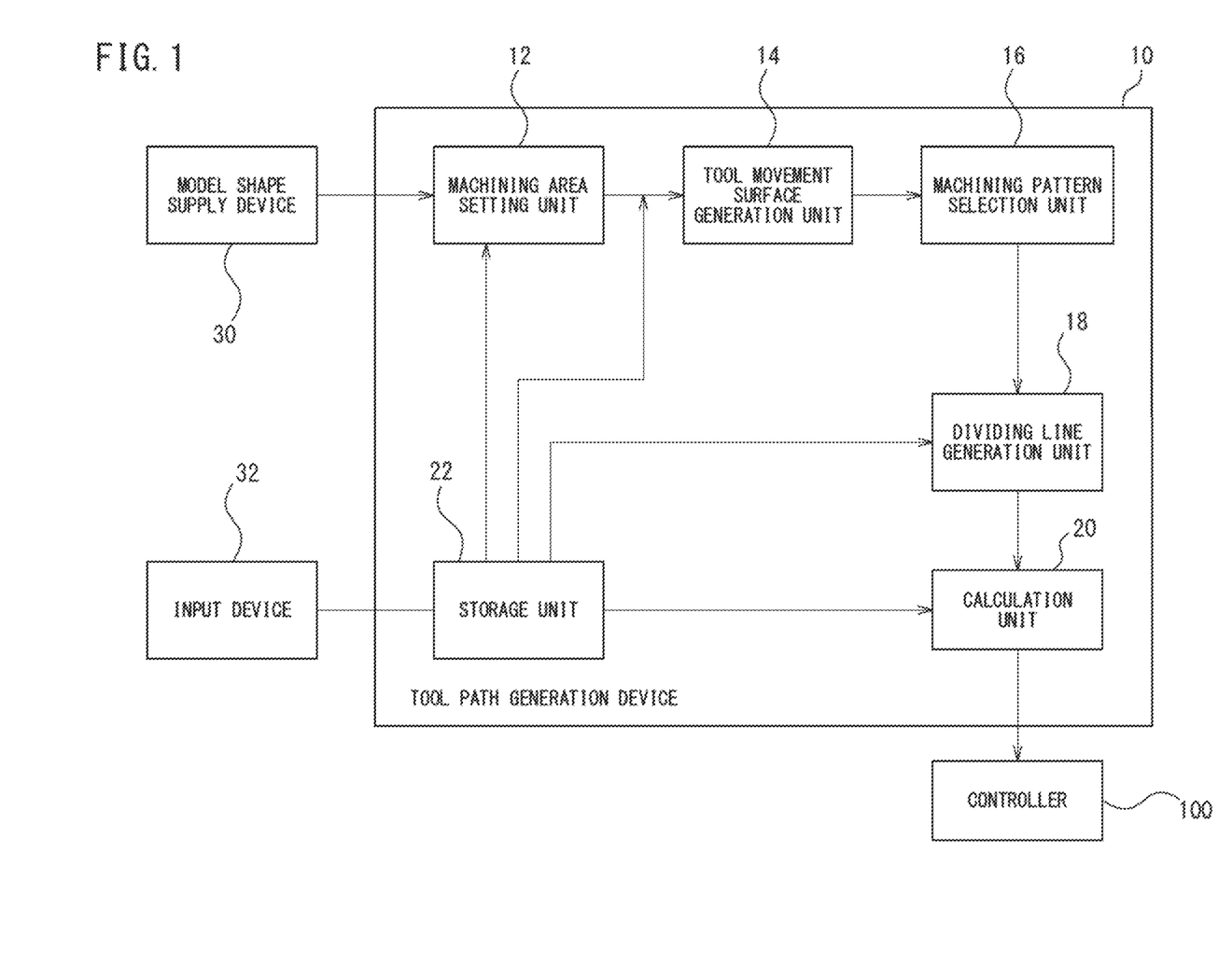
FIG. 1 is a block diagram of a tool path generation device according to an embodiment of the present invention.

FIG. 1 is a block diagram of a tool path generation device 10 according to an embodiment of the present invention. The tool path generation device 10 comprises, as primary constituent elements, a machining area setting unit 12, a tool movement curved surface generation unit 14, a machining pattern selection unit 16, a dividing line generation unit 18, a calculation unit 20, and a storage unit 22. The tool path generation device 10 can be composed of a computer comprising a CPU (central processing unit), a memory device such as RAM (random access memory) or ROM (read-only memory), a storage device such as an HDD (hard disk drive) or SSD (solid-state drive), input/output ports, and bidirectional busses connecting these components to each other, as well as associated software.

Various types of data necessary for generating tool paths are stored in the storage unit 22. The types of data stored in the storage unit 22 include, for example, data related to tools (tool data) such as tool management numbers, tool and tool holder dimensions and shapes, and tool materials, data related to machining conditions (machining condition data) such as feed speed, tool rotation speed, pick feed amount, presence/absence of coolant, machining patterns, area division data for dividing the surface to be machined into a plurality of machining areas, basic data for selecting the optimum tool for machining a certain machined surface, and data related to materials (material data) such as material type, hardness, tensile strength, and elastic modulus. Note that the storage unit 22 may be accessed from the input device 32 so that the operator can modify the data stored in the storage unit 22 or input new data.

The machining area setting unit 12 receives model shape data from a model shape supply device 30. The model shape data is data representing the shape of the workpiece to be machined, and in particular, the shape of a workpiece for which finishing machining is completed. The model shape supply device 30 can typically be a CAD device. When the model shape data is stored in a computer or database, such as when a past product is produced again, the model shape supply device 30 can be a computer or a database in which model shape data is stored.

The machining area setting unit 12 divides the surface of the workpiece to be machined (to be machined surface) into a plurality of machining areas based on the model shape data received from the model shape supply device 30 and the data stored in the storage unit 22. More specifically, the machining area setting unit 12 recognizes the shape of the surface of the workpiece to be machined from the model shape data, and based on area division data stored in the storage unit 22 and the recognized shape of the surface to be machined, divides the surface to be machined into a plurality of machining areas using the curvature, inclination angle, depth, etc., of the surface to be machined as surface parameters.

Figure 2:
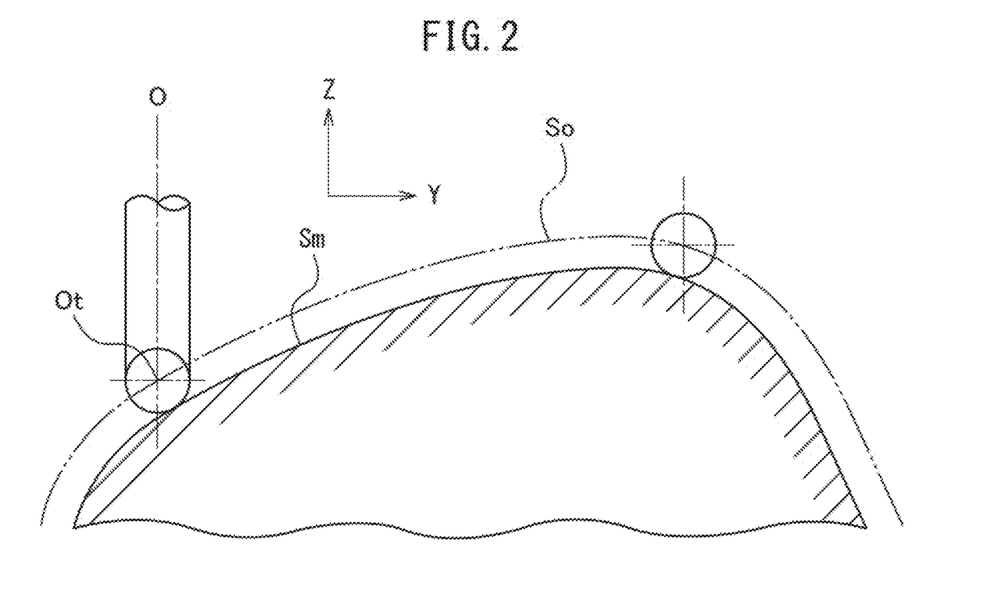
FIG. 2 is a view showing a scanning machining path.
Figure 3:
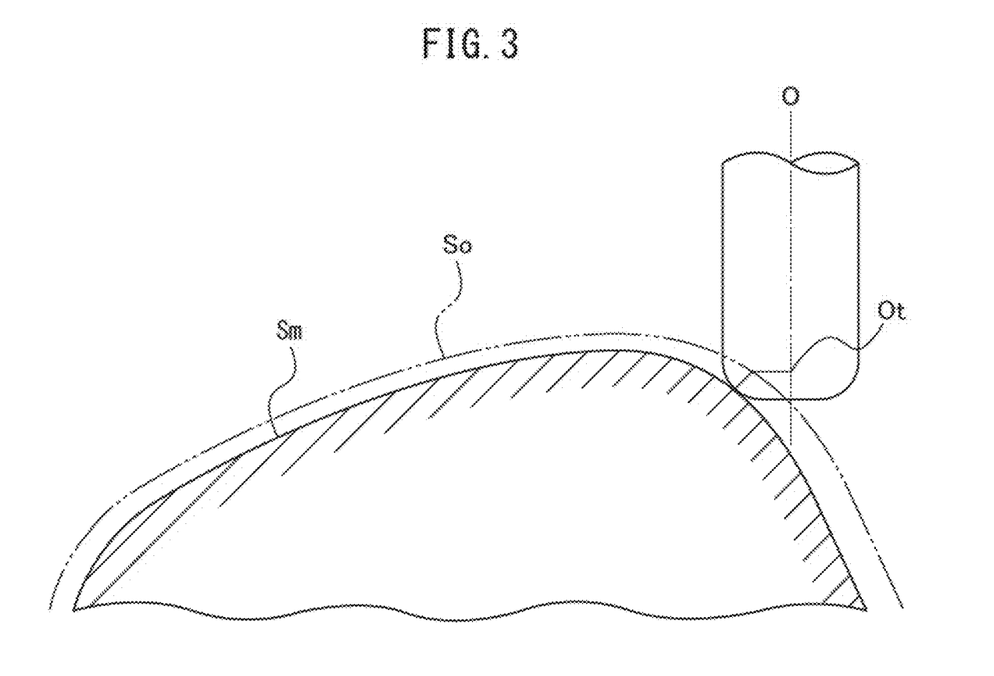
FIG. 3 is a view in which the machining path of FIG. 2 is projected onto a plane orthogonal to the center axis of the tool.
Figure 4:
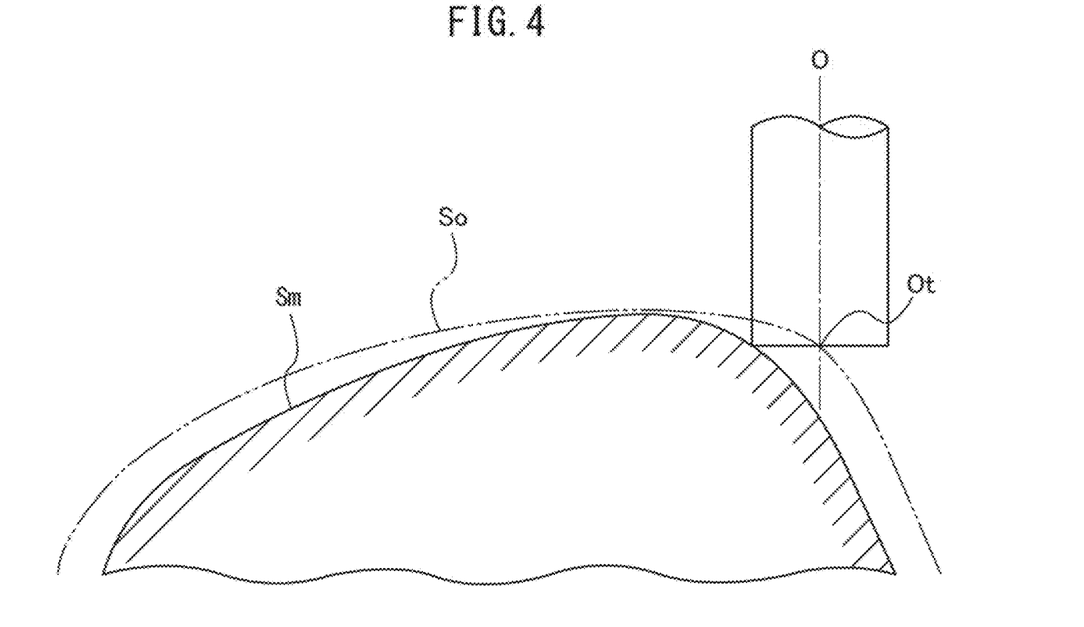
FIG. 4 is a view showing an equal-height contour machining path.

The tool movement curved surface generation unit 14 generates a tool movement curved surface for each of the machining areas set by the machining area setting unit 12. An optimal example of the tool movement curved surface is the offset curved surface So (FIGS. 2 to 4). The offset curved surface So is a curved surface encompassing a set of positions where the center point Ot of a tool T is arranged during machining, or a curved surface along which the center point Ot of the tool T moves in the machined area in order to form a machined surface Sm. The tool movement curved surface is not limited to the offset curved surface So. For example, if the size of the tool can be ignored, the machined surface Sm can be specified as the tool movement curved surface.

When the tool T is a milling tool, the center point Ot of the tool T is a position retracted from the tip surface toward the shank along the center axis O of the tool T by the radius R of the corner portion of the tool T, i.e., the arc-shaped outer peripheral portion at the tip of the tool T. For example, as shown in FIG. 2, when the tool T is a ball end mill, the center of the ball tip is the center point Ot of the tool T. When the tool T is a bull nose ball end mill, as shown in FIG. 3, the center point Ot of the tool T is a position retracted from the tip surface toward the shank side along the center axis O by the radius R of the corner part of the tool T, and as shown in FIG. 4, when the tool T is a square end mill, the position where the tip surface of the tool T and the center axis O intersect is the center point Ot of the tool T. The position of the center point Ot of the tool T is stored as tool data in the storage unit 22.

In the present embodiment, the tool movement curved surface generation unit 14 generates the offset curved surface So as the tool movement curved surface for each of the machining areas set by the machining area setting unit 12 based on model shape data and data related to the position of the center point Ot of the tool T.

Figure 5:
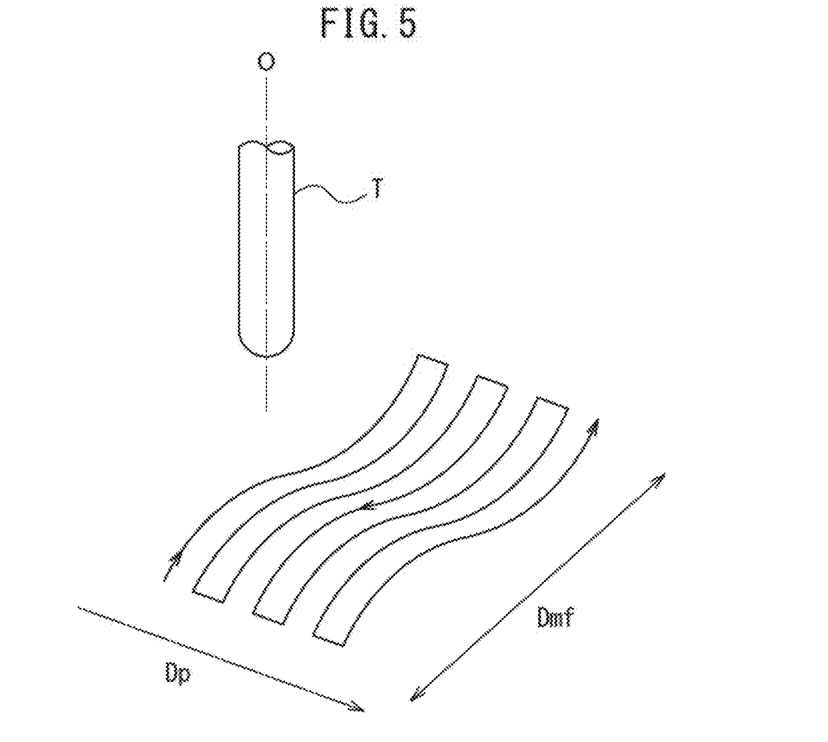
FIG. 5 is a view showing a radial machining path.
Figure 6:
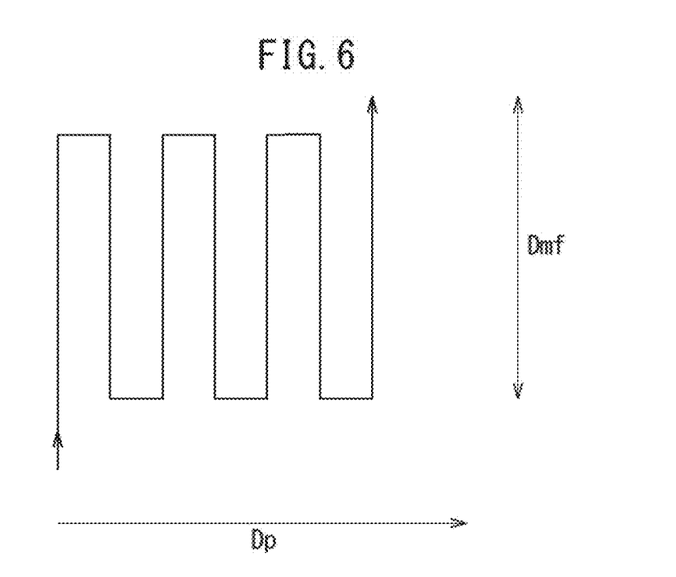
FIG. 6 is a view showing an offset curved surface in the case in which the tool is a ball end mill.

The machining pattern selection unit 16 selects the optimum tool and machining pattern for machining the machining area corresponding to each surface parameter of the machining area, and sets machining conditions such as feed rate, tool rotation speed, and pick feed amount. FIGS. 5 to 8 show examples of machining patterns. FIG. 5 shows a scanning path, and FIG. 6 is a view in which the machining path of FIG. 5 is projected onto a plane orthogonal to the center axis O of the tool T. According to the scanning machining path, the tool T, for example, a ball end mill, is linearly fed in one direction along the cutting feed direction Dmf to cut the workpiece, the tool T is pick-fed in the pick feed direction Dp, the workpiece is then machined while feeding the tool T in the opposite direction along the cutting feed direction Dmf, and this is repeated to machine the surface of the workpiece to be machined.

Figure 7:
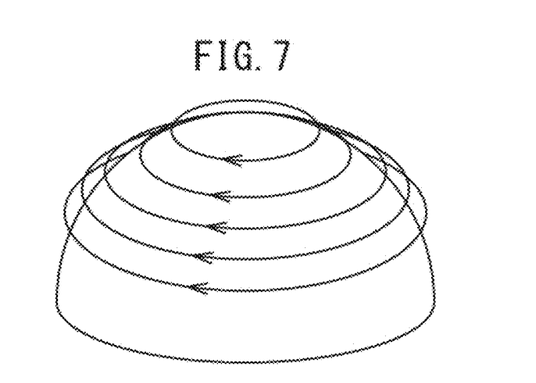
FIG. 7 is a view showing an offset curved surface in the case in which the tool is a bull nose end mill.
Figure 8:
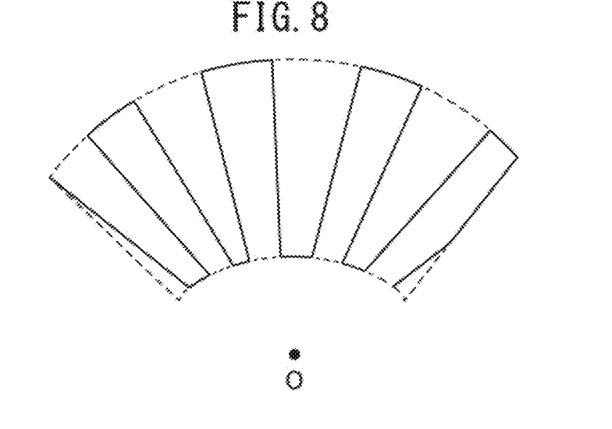
FIG. 8 is a view showing an offset curved surface in the case in which the tool is a square end mill.

Furthermore, FIG. 7 shows an equal-height contour machining path, and FIG. 8 shows an example of a radial machining path centered on a point O. These machining patterns are stored in the storage unit 22 so that the machining pattern corresponding to the surface parameters such as the curvature, the inclination angle, and the depth of the machining region, can be selected reflecting the accumulated know-how. Furthermore, the machining patterns shown are examples and are not intended to limit the present invention.

Figure 9:
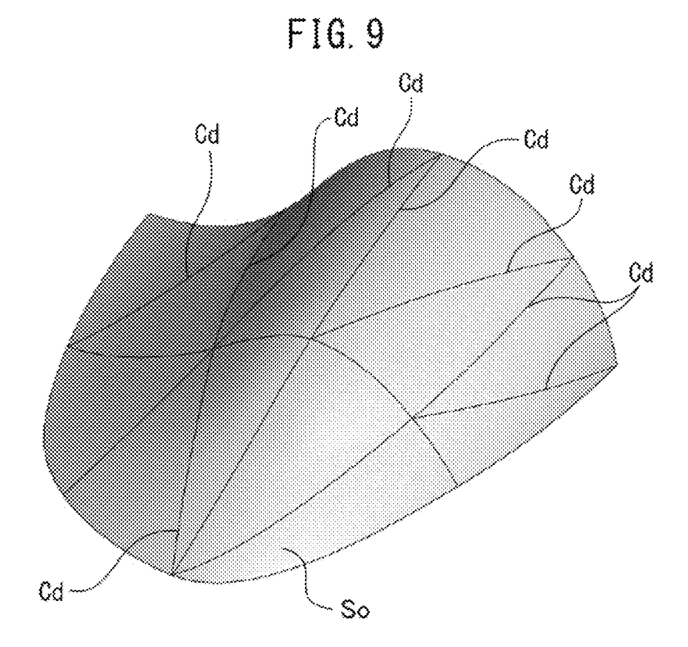
FIG. 9 is a view showing triangular dividing lines.

The dividing line generation unit 18 generates dividing lines consisting of a plurality of curves extending along the tool movement curved surface. In the present embodiment, the dividing line generation unit 18 generates dividing lines Cd on the offset curved surface So. The dividing lines Cd can be generated by, for example, as shown in FIG. 9, arranging a large number of generatrixes P along the offset curved surface So and connecting the generatrixes P with curves along the offset curved surface so as to form non-Euclidian geometric shapes, such as triangles in FIG. 9. Because they are drawn on a curved surface, they are not triangles in the strict sense, but rather are pseudo-triangles in which three vertices (the generatrixes P) are connected by the shortest path along a curved surface (the offset curved surface So), or pseudo-triangles in which a triangle drawn on a certain plane is projected onto the offset curved surface So. The Delaunay triangulation method may be used to generate the triangular dividing lines Cd.

Figure 10:
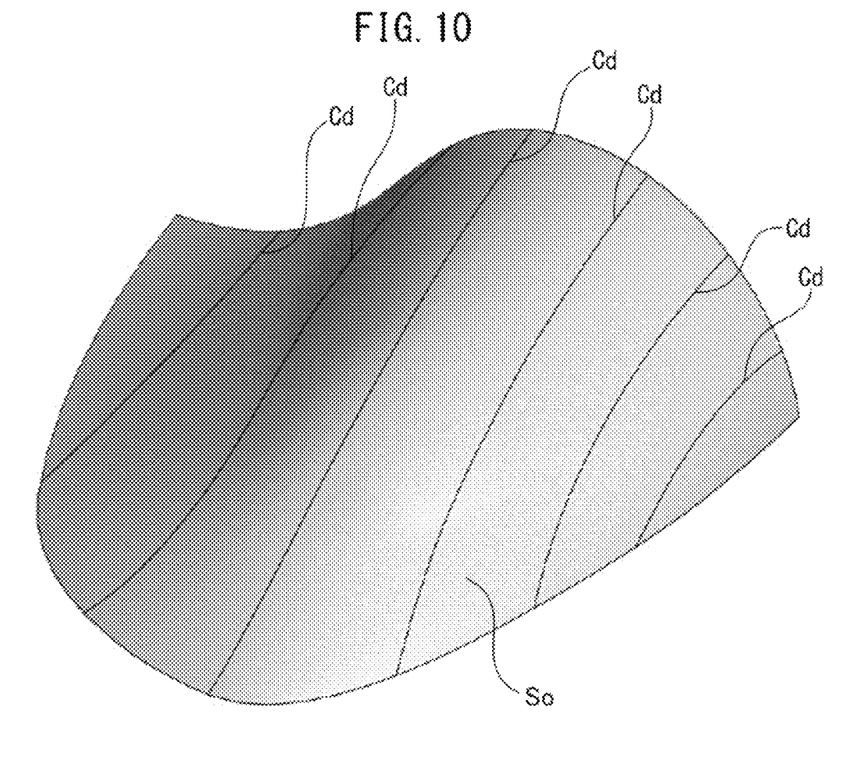
FIG. 10 is a view showing dividing lines consisting of parallel lines.
Figure 11:
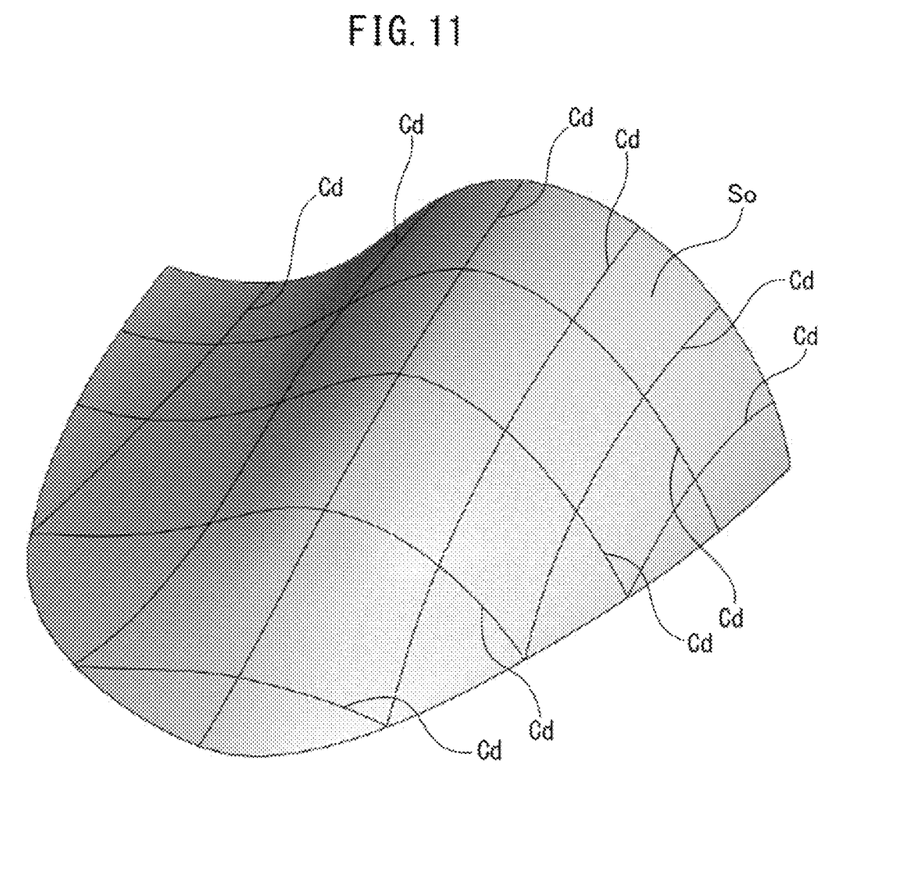
FIG. 11 is a view showing lattice-like dividing lines.

The dividing lines Cd are not limited to the triangular shapes shown in FIG. 9, but parallel lines (FIG. 10) or a lattice (FIG. 11) may be used. The parallel dividing lines Cd are pseudo parallel lines passing through two generatrixes P along the offset curved surface So, and the dividing lines Cd on a lattice form a pseudo lattice in which the number of vertices (generatrixes P) is increased to four points. The dividing lines Cd may be defined by a curve obtained by projecting a plurality of triangles, rectangles, and parallel lines arranged on a plane facing the offset curved surface So onto the offset curved surface So.

Figure 13:
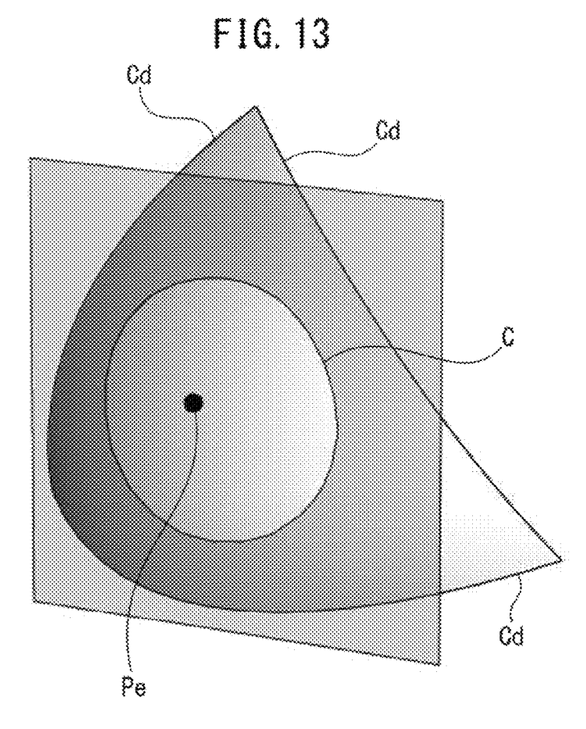
FIG. 13 is a view detailing the method for determining intersections in the case in which the normal of the curved surface is oriented in the pick feed direction.
Figure 14:
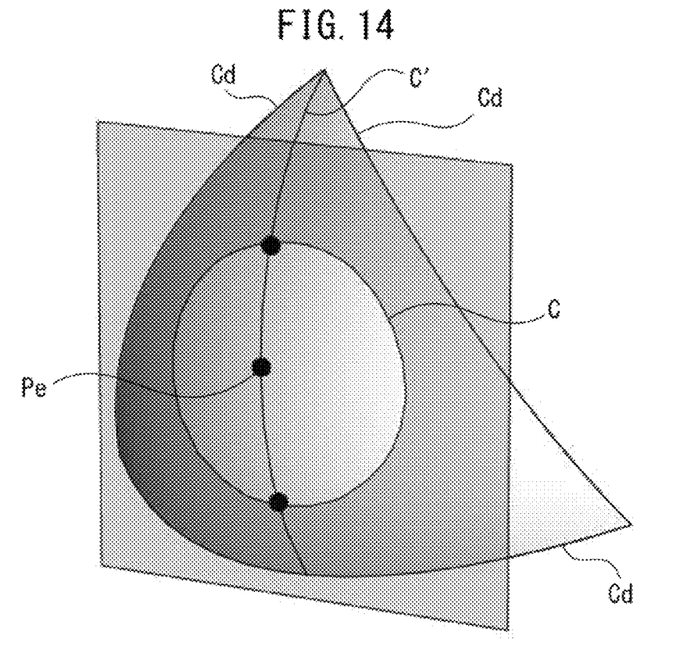
FIG. 14 is a view detailing the method for determining intersections in the case in which the normal of the curved surface is oriented in the pick feed direction.

Furthermore, as shown in FIG. 13, in the vicinity of the highest point of the curved surface, the curve C, which is the trajectory of the center point Ot of the tool T when the tool T moves on the offset curved surface So based on the scanning policy, may not intersect with a dividing line Cd. In that case, as shown in FIG. 14, the highest point Pe of the curved surface is obtained, and a curve C' which passes through the highest point Pe along the curved surface is created. For example, when the highest point of the curved surface is included inside a triangle, a process of dividing this triangle into two triangles by a curve C' passing through the highest point Pe can be performed.

Figure 12:
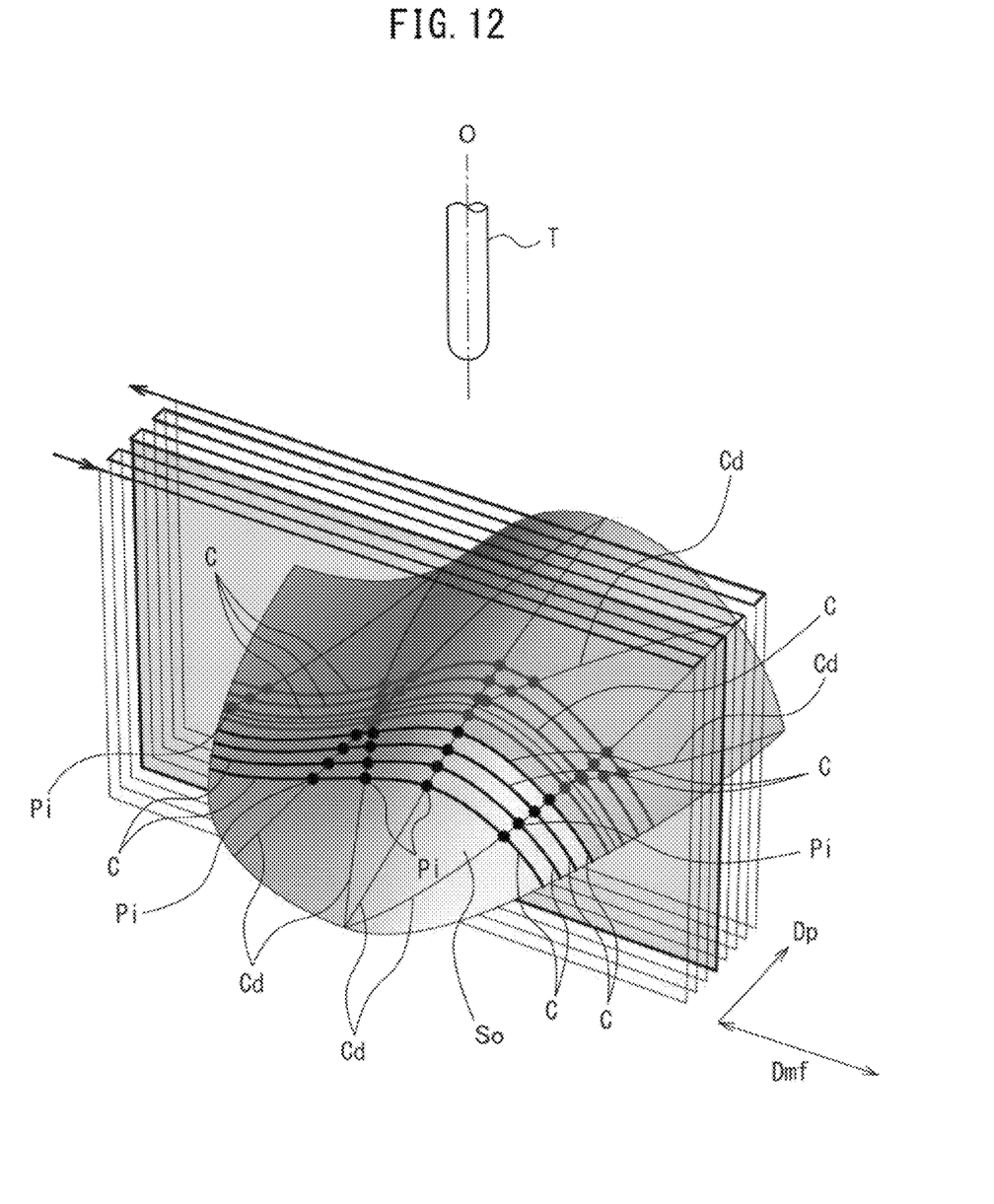
FIG. 12 is a view showing a scanning policy in which a machining path is projected toward an offset curved surface in the direction of the center axis of a tool.

The calculation unit 20 calculates the positions of the intersections Pi between the curve C, which is the trajectory of the center point Ot of the tool T when the tool T moves on the offset curved surface So based on the scanning policy, and the dividing lines Cd. The scanning policy can be, for example, a plurality of X-Z planes intersecting the offset curved surface So. In the present example, the positions of the intersections Pi between the X-Z planes and the dividing lines Cd on the offset curved surface So are obtained by calculation. Alternatively, as the scanning policy, as shown in FIG. 12, the machining path selected by the machining pattern selection unit 16 may be projected toward the offset curved surface So in the direction of the center axis O of the tool T, and the intersections Pi between the projected curves C and the dividing lines Cd may be obtained. Alternatively, X-Y planes may be used as the scanning policy. In this case, the intersections Pi between the contour machining path of FIG. 4 and the dividing lines Cd are obtained. The scanning policy may project a three-dimensional curve C along the boundary lines between the machining areas or the surfaces of the workpiece to be machined onto the offset curved surface So.

The calculation unit 20 then calculates the intersections Pi between the curve C generated in this manner and the dividing lines Cd, and smooths the sequence of points along the curve C given by the intersections Pi using a technique such as Bezier curves, B-spline curves, NURBS curves, simple averaging, and weighted averaging. For example, the calculation unit 20 can obtain the tangent vectors Vt of the curve C at the intersections Pi, and use the tangent vectors Vt to perform interpolation and smoothing by means of the NURBS curve connecting the intersections Pi. The calculation unit 20 then generates a tool path Tp (FIG. 15) represented by movement commands based on the smoothed curve. The tool path Tp represented by movement commands generated in this manner can be output to the controller 100 of the machine tool.

Figure 15:
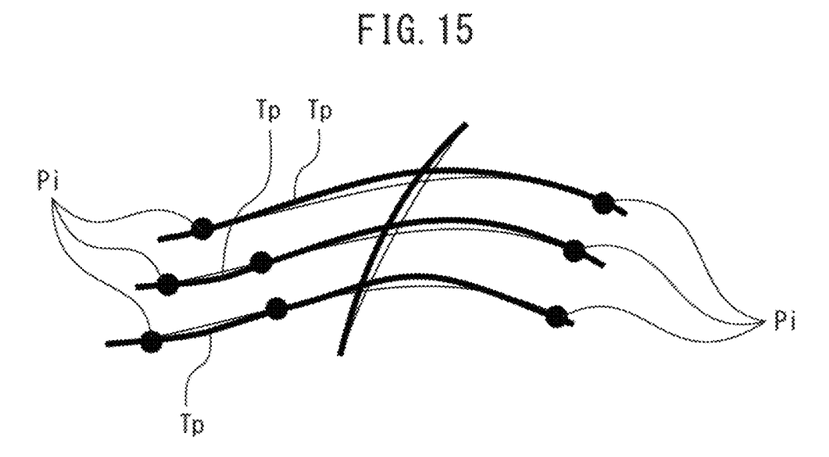
FIG. 15 is a view detailing a tool path generated by a tool path generation device according to a preferred embodiment of the present invention.
Figure 16:
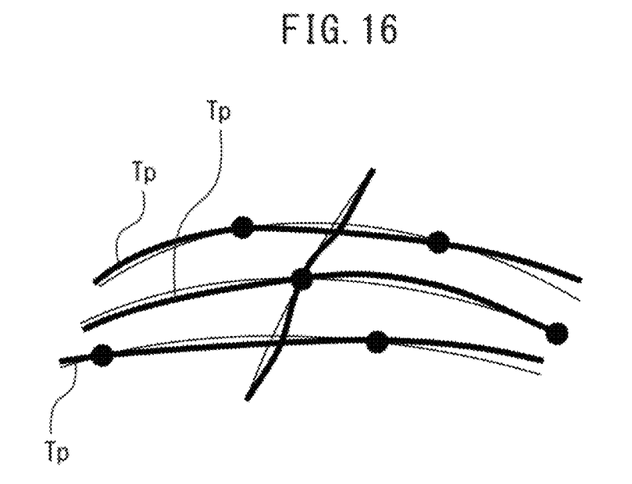
FIG. 16 is a view detailing a tool path generated according to the prior art.

For example, in a conventional tool path generation method in which a tool path is generated using a spline curve such as NURBS, even if each tool path Tp has no path error at the connection points and the curvature changes continuously, as shown in FIG. 16, the envelope may not be smooth in the transverse direction of the tool path Tp, and specifically, steps may be formed between adjacent tool paths Tp, whereby a smooth machined surface may not be obtained. In connection thereto, according to the present embodiment, since one machining area is divided into a plurality of curved surfaces by the dividing lines Cd and smoothed so that the connection points (intersection points Pi) of the curve C are located on the dividing lines Cd between the curved surfaces, as shown in FIG. 15, envelope inflation in a direction transverse to the tool path Tp becomes smaller, whereby a smooth machined surface can be obtained.

Figure 17:
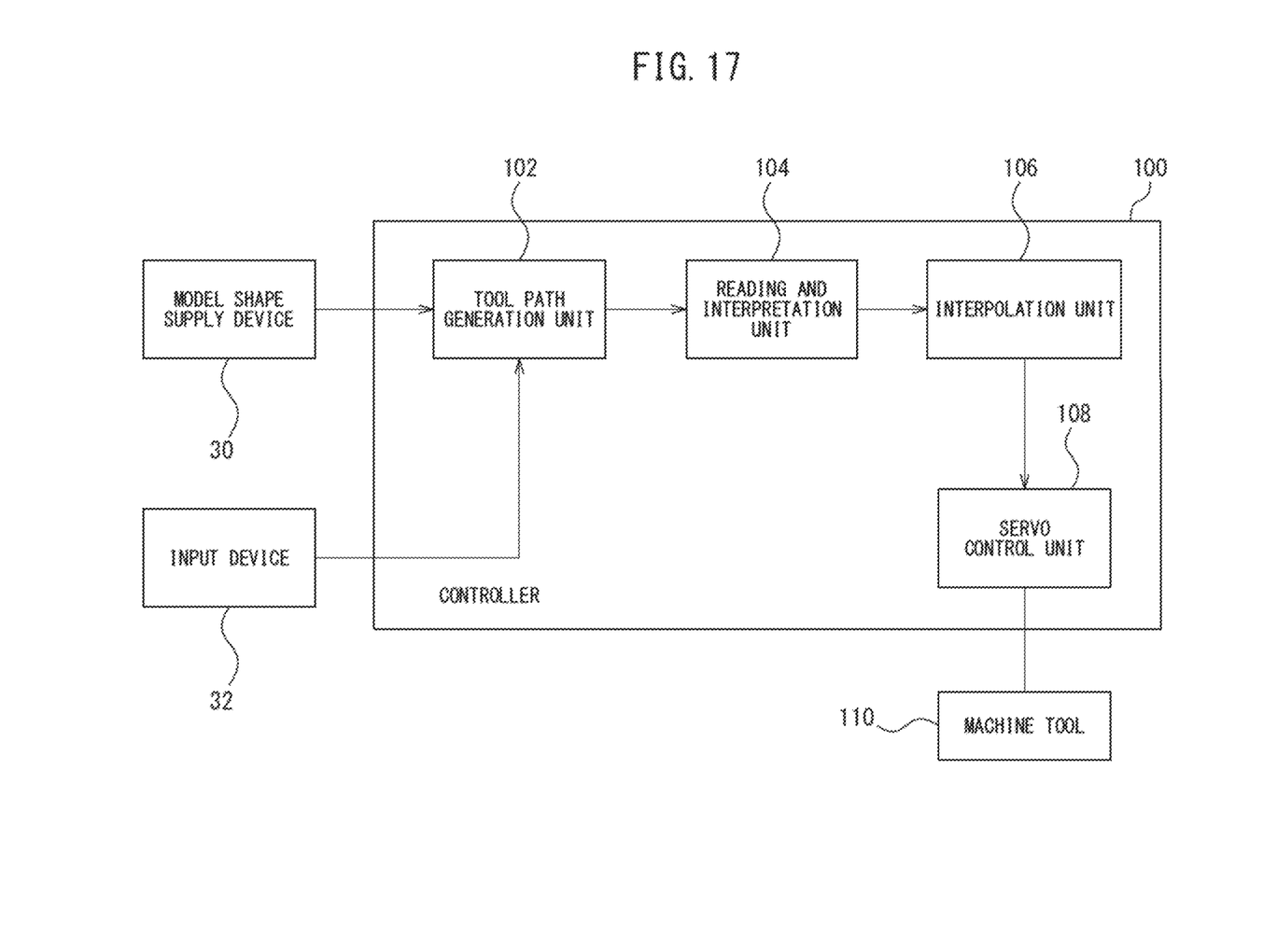
FIG. 17 is a block diagram of a controller of a machine tool comprising the tool path generation device of the present invention.

Though the tool path generation device 10 described above can be configured as a CAM device independent of the controller of the machine tool, it may be configured as a part of the controller, as shown in FIG. 17. In FIG. 17, the controller 100 comprises, as primary structures, a tool path generation unit 102 having the same structure as the tool path generation device 10 of FIG. 1, a reading and interpretation unit 104, an interpolation calculation unit 106, and a servo control unit 108.

The reading and interpretation unit 104 reads the tool path (machining program) represented by movement commands from the tool path generation unit 102. The reading and interpretation unit 104 transmits the movement commands to the interpolation calculation unit 106. The interpolation calculation unit 106 calculates position command values for each interpolation cycle. For example, the interpolation calculation unit 106 calculates the movement amount for each time interval set based on the movement commands. The interpolation calculation unit 106 transmits the position command values to the servo control unit 108. The servo control unit 108 calculates the movement amount in each feed axis, such as the X axis and the Y axis, based on the position command values, and drives each axis servomotor of the machine tool 110.

The machine tool 110 can be a vertical or horizontal machining center which machines a workpiece (not illustrated), wherein a rotary tool such as a ball end mill is mounted on the tip of a spindle (not illustrated) and the spindle is relatively moved in the three orthogonal X, Y, and Z axis directions relative to the workpiece, which is affixed to a table (not illustrated) so as to face the rotary tool.

DESCRIPTION OF REFERENCE SIGNS

10 Tool Path Generation Device
12 Machining Area Setting Unit
14 Tool Movement Curved Surface Generation Unit
16 Machining Pattern Selection Unit
18 Dividing Line Generation Unit
20 Calculation Unit 22 Storage Unit
30 Model Shape Supply Device
32 Input Device
100 Controller
102 Tool Path Generation Unit
104 Reading And Interpretation Unit
106 Interpolation Calculation Unit
108 Servo Control Unit
110 Machine Tool

The invention claimed is:

1. A device for generating a plurality of adjoining tool paths which is a movement path of a rotary tool with respect to a workpiece for machining the workpiece by moving the rotary tool and the workpiece relative to each other, the device comprising a computer aided manufacturing (CAM) device and a processor, wherein the processor is configured to:
- generate a tool movement curved surface along a surface of the workpiece to be machined,
- select a machining pattern which defines a scanning policy for determining a path of a scanning machining path, an equal-height contour machining path or a radial machining path along which the tool moves repeatedly and adjacently,
- generate dividing lines along the tool movement curved surface,
- project the machining pattern selected by the machining pattern selection unit onto the tool movement curved surface,
- calculate positions of intersections between curves which are trajectories of the tool when the tool moves along the tool movement curved surface and the dividing lines so that the intersection points on adjacent trajectories are adjacent each other along the dividing line,
- determine tangent vectors of the curves at the intersection points,
- determine a Nerves curve, a Bezier curve or a B-spline curve passing and connecting the intersection points using the tangent vector, and
- generate a tool path represented by movement commands which interpolates the intersection points using the Nerves curve, the Bezier curve or the B-spline curve;
- wherein the CAM device sends the tool path to a controller of a machine tool, and
- wherein the machine tool cuts the workpiece according to the tool path.

2. The tool path device according to claim 1, wherein the dividing lines are generated so that a plurality of generatrixes are arranged on the tool movement curved surface and the generatrixes are connected by a curve along the tool movement curved surface to form triangles.

3. The device of claim 1, wherein the machine tool cuts the workpiece with a ball end mill.

4. The device of claim 1, wherein the machine tool cuts the workpiece with a bull nose ball end mill.

5. The device of claim 1, wherein the machine tool cuts the workpiece with a square end mill.

6. The device of claim 1, wherein the machine tool and the processor are part of a common device.

* * * * *